(12) United States Patent
Hoepfl et al.

(10) Patent No.: US 8,869,641 B2
(45) Date of Patent: Oct. 28, 2014

(54) INDEXING GEAR TRAIN FOR ON-LOAD TAP CHANGERS OF STEP TRANSFORMERS

(75) Inventors: Klaus Hoepfl, Maxhuette-Haidhof (DE); Gregor Wilhelm, Regensburg (DE)

(73) Assignee: Maschinenfabrik Reinhausen GmbH, Regensberg (DE)

( * ) Notice: Subject to any disclaimer, the term of this patent is extended or adjusted under 35 U.S.C. 154(b) by 8 days.

(21) Appl. No.: 13/638,791

(22) PCT Filed: Feb. 23, 2011

(86) PCT No.: PCT/EP2011/000850
§ 371 (c)(1),
(2), (4) Date: Oct. 25, 2012

(87) PCT Pub. No.: WO2011/128011
PCT Pub. Date: Oct. 20, 2011

(65) Prior Publication Data
US 2013/0199336 A1     Aug. 8, 2013

(30) Foreign Application Priority Data

Apr. 15, 2010   (DE) .......................... 10 2010 015 052

(51) Int. Cl.
*F16H 27/00*     (2006.01)
*H01H 19/00*     (2006.01)
*H01H 9/00*      (2006.01)
*F16H 27/04*     (2006.01)

(52) U.S. Cl.
CPC .............. *F16H 27/04* (2013.01); *H01H 9/0027* (2013.01)
USPC ........................................ 74/112; 200/11 TC

(58) Field of Classification Search
CPC ............................. F16H 27/04; H01H 9/0027
USPC .................. 74/111, 112, 116, 126, 128, 141; 200/11 TC, 17 R, 500; 323/255, 340
See application file for complete search history.

(56) References Cited

U.S. PATENT DOCUMENTS

| | | | | |
|---|---|---|---|---|
| 2,785,242 | A | * | 3/1957 | White .............................. 200/18 |
| 3,553,395 | A | * | 1/1971 | White .............................. 200/18 |
| 3,761,650 | A | * | 9/1973 | Fohrhaltz ..................... 200/17 R |
| 3,798,395 | A | * | 3/1974 | Norman et al. ............. 200/17 R |

(Continued)

FOREIGN PATENT DOCUMENTS

| | | |
|---|---|---|
| DE | 1039129 A | 4/1954 |
| DE | 2339973 A | 2/1974 |

(Continued)

*Primary Examiner* — Thomas R. Hannon
*Assistant Examiner* — Adam D Rogers
(74) *Attorney, Agent, or Firm* — Andrew Wilford

(57) ABSTRACT

An indexing transmission for an on-load tap changer or a tap selector of a tapped transformer has a rotatable cam disk having an outer edge formed with a succession of convex and concave cam formations in regular succession and merging with one another, a crank transmission driving the cam disk, and a drive output disk acted on by the cam disk and having an outer edge. Engagement rollers rotatable on an end face of the drive output disk near the outer edge of the drive output disk roll on the outer edge of the cam disk. A switch shaft is rotationally fixed to the drive output disk such that the cam disk in cooperation with the engagement rollers of the drive output disk triggers a stepped rotation of the switch shaft through a defined step angle.

6 Claims, 3 Drawing Sheets

(56) References Cited

U.S. PATENT DOCUMENTS

| | | | | |
|---|---|---|---|---|
| 4,207,445 A | * | 6/1980 | Hammar | 200/11 TC |
| 5,165,295 A | | 11/1992 | Dohnal | |
| 8,119,939 B2 | * | 2/2012 | Albrecht et al. | 200/11 TC |
| 8,191,444 B2 | * | 6/2012 | Von Allmen et al. | 74/650 |
| 2012/0103766 A1 | * | 5/2012 | Hoepfl et al. | 200/11 J |
| 2013/0341166 A1 | * | 12/2013 | Albrecht et al. | 200/11 TC |

FOREIGN PATENT DOCUMENTS

| | | |
|---|---|---|
| DE | 2608051 A | 9/1977 |
| FR | 2193236 A | 2/1974 |
| FR | 2482361 A | 11/1981 |

\* cited by examiner

INDEXING GEAR TRAIN FOR ON-LOAD TAP CHANGERS OF STEP TRANSFORMERS

CROSS REFERENCE TO RELATED APPLICATIONS

This application is the US-national stage of PCT application PCT/EP2011/000850 filed 23 Feb. 2011, published 20 Oct. 2011 as WO2011/128011, and claiming the priority of German patent application 102010015052.5 itself filed 15 Apr. 2010.

FIELD OF THE INVENTION

The present invention relates to an indexing transmission for on-load tap changers of tapped transformers in which at least one cam disk driven by a crank transmission cooperates with a drive output disk carrying engagement elements, the drive output disk is connected with a switch shaft to be secure against rotation relative thereto, and the at least one cam disk in cooperation with the engagement elements of the drive output disk triggers stepped rotation of the switch shaft through a defined step angle.

BACKGROUND OF THE INVENTION

Indexing transmissions of this kind or similar are disclosed by, for example, DE 26 08 051 A that shows a preselector, as well as by U.S. Pat. No. 2,785,242 A that shows a so-called turning arrangement. In this known construction of indexing transmissions it is necessary to provide suitable mechanical means for end position blocking. These end position blocking means have to reliably prevent the possibility of movement beyond the end positions of the tap selector or on-load tap changer that would normally lead to significant damage of the tap selector.

In addition, DE 10 39 129 A discloses a mechanical end position block in which a separate blocking disk, which is coaxially connected with a control disk for actuation of the tap selector, cooperates with a pawl that in turn can be actuated via intermediately arranged mechanical means by the control disk. This end position block is mechanically complicated and, moreover, unsuitable for blocking two mutually independently movable Maltese wheels arranged concentrically one above the other.

DE 23 39 973 A shows an arrangement in which an abutment on the Maltese cross at the appropriate instant actuates a turning arrangement or preselector by a lever system.

DE 40 09 503 C2 discloses a further development of an indexing transmission for tap selectors of tapped transformers in which two Maltese wheels concentric one above the other on a common tap selector axis are driven by a Maltese crank having an upper and a lower entrainer pin. These two entrainer pins are offset relative to one another by 180° and engage in roller slots of the respective Maltese wheel. In addition, one Maltese wheel cooperates with a turning abutment, by which a turning lever pivotal on the shaft for actuation of a turning means or preselector at a specific point of the switching sequence. The turning lever carries a blocking plate displaceable by a slot on the shaft carrying the turning lever.

OBJECT OF THE INVENTION

An object of the present invention is to provide an indexer that operates reliably and with as low friction as possible and/or with easy running, for an indexing transmission of an on-load tap changer or tap selector of a tapped transformer, in which the driven element is reliably fixed in its operational setting.

SUMMARY OF THE INVENTION

In order to achieve the object of the invention the present invention proposes an indexing transmission for an on-load tap changer, tap selector or comparable switch of a tapped transformer, in which at least one cam disk driven by a spring, cooperates with a drive output disk with engagement elements arranged rotatably mounted thereon. This drive output disk is connected by the engagement elements rotatably mounted thereon with a switch shaft to be secure against relative rotation. This arrangement serves the purpose of allowing the cam disk in cooperation with the engagement elements of the drive output disk to trigger a stepped rotation of the switch shaft through a defined step angle. The present invention provides that the engagement elements are formed by respective rollers rotatably mounted at an end face near the outer edge of the disk and rolling on the outer edge of the at least one cam disk by a corresponding engagement profile with convex and concave cam sections in regular succession and merging one into the other. Such a configuration forms a roller pair in which the engagement elements constructed as rollers roll on the outer edge that forms an alternatingly curved cam of the cam disk without appreciable sliding movements with accompanying friction effects then occurring. By comparison with a previously used Maltese transmission the significant advantage arises of a very easy-running reciprocal drive transmission with at the same time a very reliable function safe against jamming. The indexing transmission according to the invention enables blocking of the disks with their rollers after each indexing in a desired or definable angular position corresponding with a defined operational setting. For this purpose, the rollers roll on suitably profiled blocking cams of the cam disks or cam disk.

In the indexing transmission according to the invention two, three or more engagement elements or rotatable rollers can be at a uniform angular spacing on the outer edge of the drive output disk. The rotational axes of the rollers are usefully oriented parallel to the rotational axis of the disk and thus also of the switch shaft so that an easy-running and reliably functioning indexing transmission with an angular pitch defined in by the selected number of rollers and the distribution thereof on the outer edge of the disk is formed. The outer profile of the cam disk and its outer edge, which is concave at least in a section, are preferably so designed that during indexing the respective roller can roll substantially free of play in the concave cam section on the edge of the cam disk whilst in the blocked position further movement is reliably prevented by the intersecting circumferential circles of the drive output disk and the cam disk and the blocking thereof by two adjacent rollers.

With the transmission arrangement according to the invention it is possible to rotationally fix the disks in angular position after each indexing of the cam disk through a defined rotational angle. The primary objective of the indexing transmission according to the invention is not position-blocking, but the particularly reliable and very easy-running and low-friction indexing function. Since the known and previously used friction lock is dispensed with in favor of a roller lock, the result is a very precisely switching rotary transmission that operates without appreciable friction and with an indexing function. The transmission function of the indexing transmission can be influenced within certain mechanical limits by the profile of the cam disk or the plurality of cam disks and/or the placing or number of the rollers on the disk. For example, in the case of a design with six rollers uniformly distributed around the edge of the disk drive, output angles of 60° or 120° can be realized by drive angles of approximately 80° to 120° depending on the desired translation ratios. Equally conceivable is influencing of the characteristics of the transmission function itself for the same ratio of drive angle to drive output angle, in that, for example, a polynomial of 5th order or a sloping sinusoidal line of the like is used. Moreover, it is possible to achieve almost any drive output angle if no two successive actuations are required in the same direction.

In a further preferred variant of the indexing transmission a pair of cam disks arranged coaxially or axially parallel to one another with substantially the same size and external profile are offset relative to one another secure against rotation on the shaft coupled with the crank transmission. This pair of cam disks is in operative engagement with a corresponding pair of disks mounted concentrically on the switch shaft and offset relative to one another and carrying engagement elements. The disks and respective cam disks in operative engagement with one another are preferably identically constructed and dimensioned in pairs offset relative to one another on the respective shafts in such a manner that a constrained guidance of the rollers and outer profiles of the cam disks rolling together is provided. The disk with the rollers mounted thereon can be further rotated only if the matching concave cam section is rotated into a position at the respective cam disk in order to accept a roller. The flowing merges from the larger diameter of the cam disk to the concave receiving formation that is formed as a recess with smaller diameter and that is preferably matched by the inner profile thereof and by the inner radius thereof to the diameter and profile of the respective rollers, then enables, on corresponding rotation of the cam disk, stepped movement of the drive output disk as well as of the switch shaft connected therewith to be secure against relative rotation. In order to enable these desired movements of the shafts parallel to one another the external profiles of the cam disks preferably roll substantially free of play or with a small radial play against the outer surfaces of the rotatably mounted rollers or engagement elements of the disk or disks.

As also made clear on the basis of the embodiments described below, the driving element of the indexing transmission according to the invention is formed from two cam disks arranged one above the other. The driven element is formed from two planes of the disk with six rollers uniformly distributed at the outer edge. The cam disks engage, during the switching process, in the plane associated therewith and move the driven element in substantially jolt-free manner from one detent setting or operational setting to the next. The rollers of the driven element in that case roll low in play on the respective cam flanks that are respective sub-sections of a continuous overall cam formed from a plurality of convex and concave sections.

An alternative variant of the indexing transmission according to the invention can provide that the cam disk has at least one blocking pin that is arranged at its end face near its outer edge and that cooperates with a star wheel with a plurality of circumferential cam sections, the star wheel being connected with the switch shaft to be secure against relative rotation and concentrical to the disk with the engagement elements. In this variant of the indexing transmission only one set of disk and cam disk in operative engagement with one another is required, since the above-explained second disk, which cooperates with a second cam disk, is replaced by the pins on the cam disk and that can engage in the star wheel connected with the switch shaft to be secure against relative rotation. The pitch of this star wheel, which has relatively deep engagement pockets for receiving the pin or the plurality of pins, is advantageously matched to the number of engagement elements or rollers present. Thus, for example, when three rollers are present three engagement pockets at the star wheel are required so that this can carry out the desired function. The mentioned star wheel resembles in its profile vaguely resembles the Maltese disks known from the prior art, but by comparison with these performs a different task, since it is merely supporting with respect to positioning of the disk relative to the rotating cam disk in order to be able to position the disk precisely in the desired angular steps and further rotate it. For this purpose the cam disk can have a blocking pin on either face adjacent to a circumferential concave cam section that cooperates with one of the engagement elements or rotatable pins of the disk and the two blocking pins cooperate with the concave cam sections of the star wheel.

The desired switching steps are realized by means of the indexing transmission according to the invention in that the cam disk in non-blocked, rotating state rolls by its outer edge substantially free of play simultaneously against two engagement elements or rotatable pins of the disk. A useful variant of the indexing transmission can, for example, be so constructed that the concave cam sections of the cam disk and the corresponding engagement elements or rotatable pins of the disk connected with the switch shaft secure against relative rotation each have a 120° pitch. Three rollers spaced uniformly around the edge of the disk and optionally concave cam sections for the blocking pins are required for such a variant. However, other pitch steps are selectably also possible, in which two, four or, for example, five or more rollers are arranged in uniform distribution over the edge of the disk.

BRIEF DESCRIPTION OF THE DRAWING

The invention is explained in more detail in the following by way of embodiments with use of the drawing described in the following, in which.

SPECIFIC DESCRIPTION OF THE INVENTION

Figure 1:
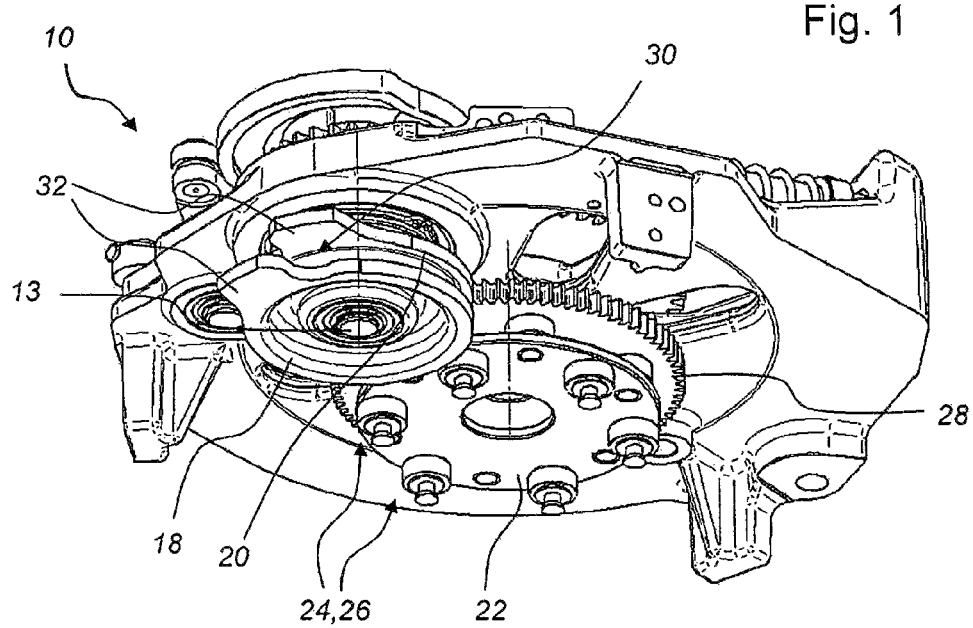
FIG. 1 is a perspective view of one variant of embodiment of an indexing transmission according to the invention.
Figure 2:
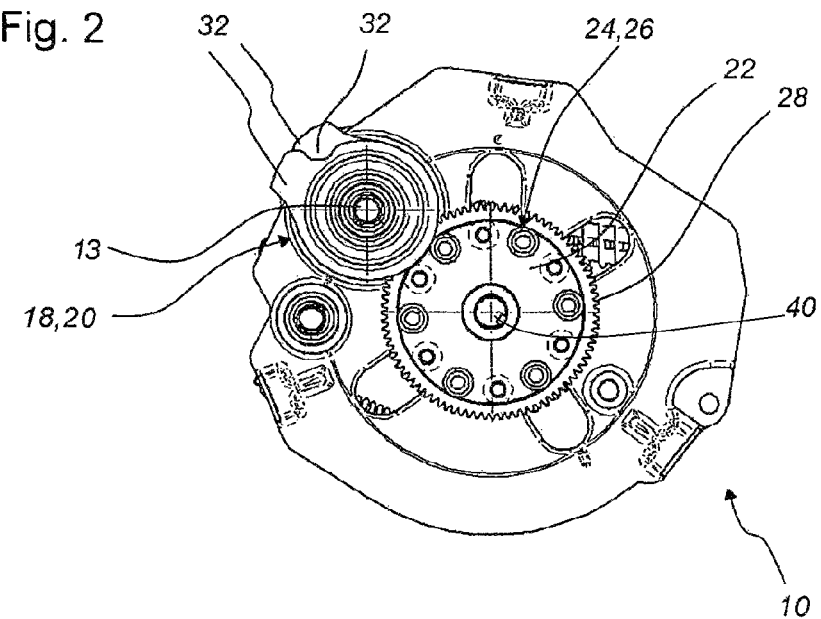
FIG. 2 is a plan view of the indexing transmission according to FIG. 1.
Figure 3:
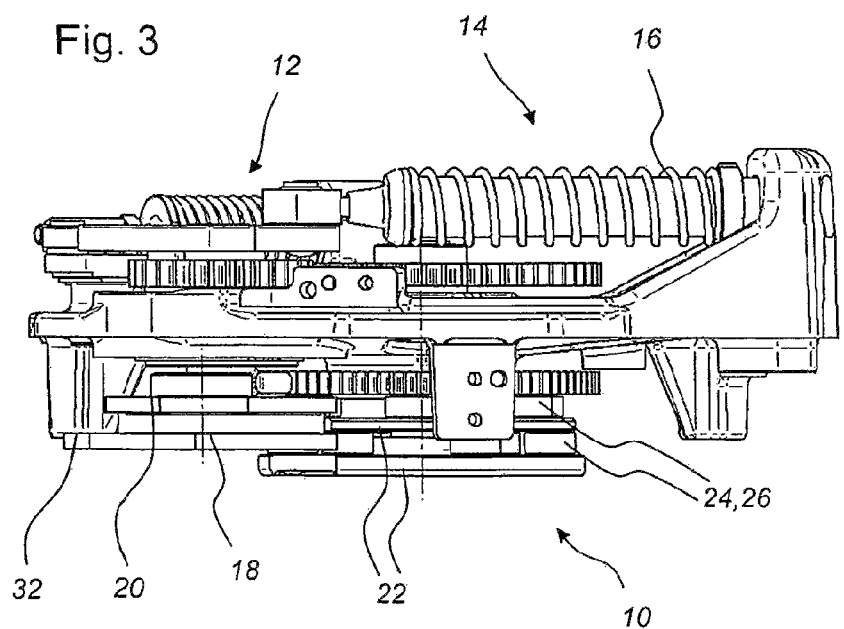
FIG. 3 is a side view of the indexing transmission according to FIG. 1.
Figure 4:
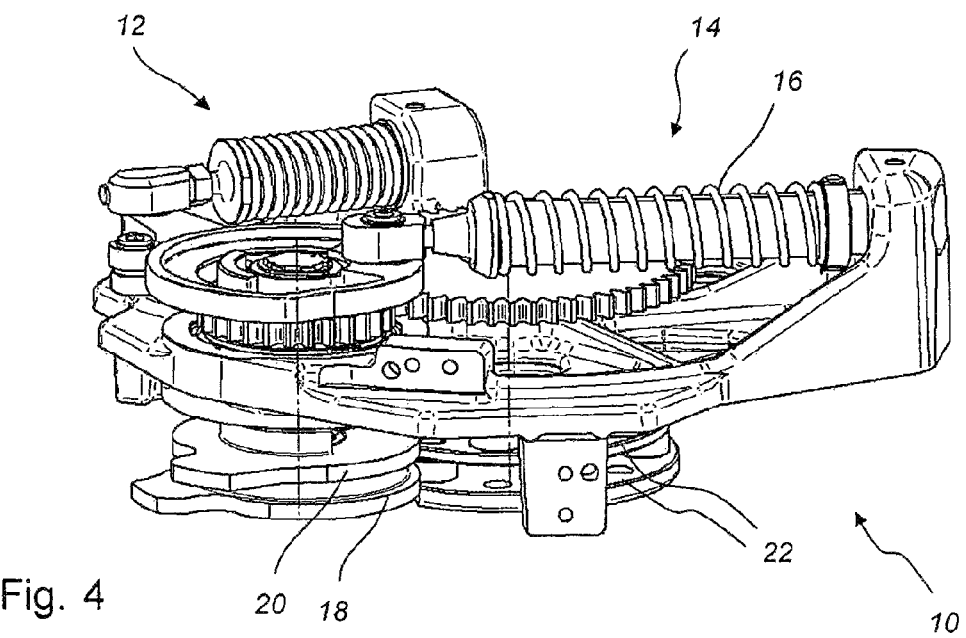
FIG. 4 is a further perspective view of the indexing transmission according to FIG. 1.

The embodiments described in the following are not to be understood as restrictive with respect to the indexing transmission according to the invention, but serve for explanation of the function and the switching possibilities of the indexing transmission.

The illustrations of FIGS. 1 to 4 show in several views a first variant of embodiment of an indexing transmission according to the invention that is denoted generally by the reference numeral 10. Such an indexing transmission 10 is used particularly in on-load tap changers (not illustrated) of a tapped transformer (here similarly not illustrated) in order to thereby activate and/or switch over tap switches, which are known per se, with mechanical switching elements and/or vacuum switching tubes. The indexing transmission 10 comprises a crank transmission 12 and at least one force-storing unit 14 coupled therewith and that in the illustrated embodiment is provided with a helical spring 16 loaded in tension and/or compression. The crank transmission 12 is coupled by a shaft 13 with a pair of cam disks 18 and 20 that cooperate with and operatively engage a disk 22 carrying rotatable engagement elements 24. These engagement elements 24 are rollers 26 rotatably mounted on the disk 22 near the outer edge thereof. The disk 22 together with the engagement elements 24 or rollers 26 rotatably fixed on a switch shaft 40. Of this rotationally fast connection, merely one drive output gear wheel 28 is shown in the illustrated embodiment.

The illustrated transmission arrangement serves the purpose of allowing the cam disks 18 and 20 in cooperation with the engagement elements 24 or rollers 26 of the disk 22 to trigger a stepped rotation of the disk 22 and thus the switch shaft 40 through a defined step angle, here for example 60° in the case of six rollers 26 present at the outer edge of the disk 22. The rollers 26 rotatably mounted on the two end faces near the outer edge of the disk 22 can engage in corresponding trough-shaped or concave cam sections 30 at the outer edge of the respective cam disk 18 or 20. In this roll pairing the rollers 26 roll on the outer edge of the cam disks 18 and 20, in which case very low friction arises.

In the case of the illustrated indexing transmission 10, in total six rotatable rollers 26 or engagement elements 24 are arranged at a regular angular pitch on the outer edge of the disk 22. The axes of rotation of the rollers 26 are parallel to the axis of rotation of the disk 22 and thus also of the switch shaft 40 so that an easy-running and reliably functioning indexing transmission 10 with an angular pitch of 60° defined in correspondence with the selected number of rollers 26 and the distribution thereof on the outer edge of the disk 22 is formed. The outer profile of the cam disks 18 and 20 with the concave cam sections or segments 30 formed therein is so designed that during the switching step the rollers 26 can roll substantially free of play in the concave cam section 30 on the edge of the respective cam disk 18 or 20, whilst in the blocked position or in the detent setting a further movement can be prevented by the intersecting circumferential circles of the disk 22 and cam disk 18 or 20 and the blocking thereof by two adjacent rollers 26. The disk 22 with the rollers 26 mounted thereon can be further rotated only when the matching recess pocket 30 of the respective cam disk 18 or 20 is rotated into a position in order to receive a roller 26. The flowing merges from the larger diameter of the cam disk 18 or 20 to the concave cam section 30 formed as a recess with smaller diameter as well as to the adjacent web 32 of greater diameter with the concave cam section 30 and the transition to the web 32 matched by the profiles thereof to the diameter and the profile of the corresponding rollers 26, then enable, with corresponding rotation of the cam disk 18 or 20, stepped movement of the disk 22 as well as of the switch shaft 40 coupled therewith. In order to enable these desired movements of the parallel shafts the outer profiles of the cam disks 18 and 20 can roll substantially free of play or with small radial play against the outer surfaces of the rotatably mounted rollers 26 or engagement elements 24 of the disk 22.

Figure 5:
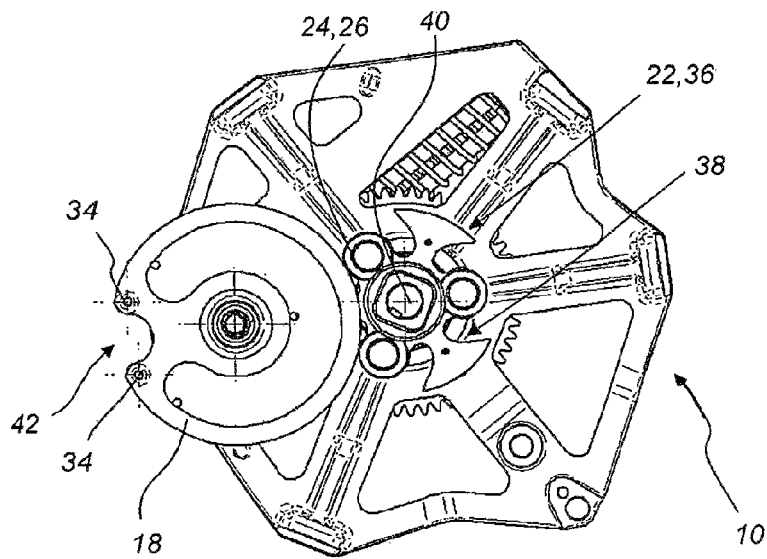
FIG. 5 is a schematic plan view of an alternative variant of embodiment of an indexing transmission according to the invention.
Figure 6:
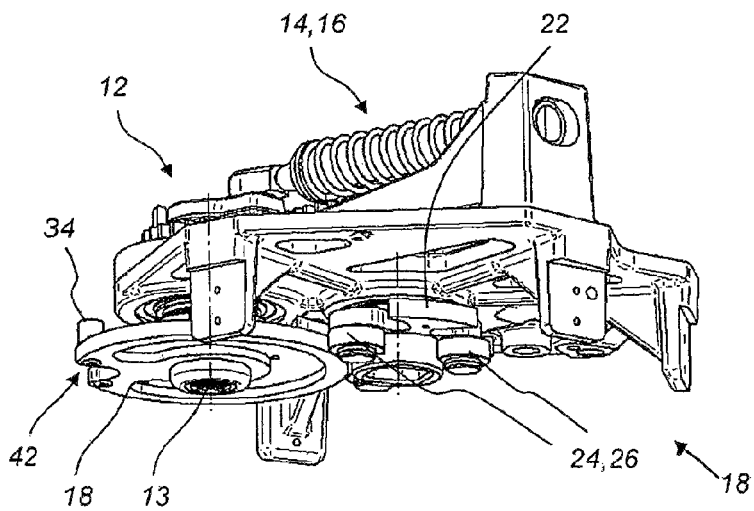
FIG. 6 is a perspective view of the indexing transmission according to FIG. 5
Figure 7:
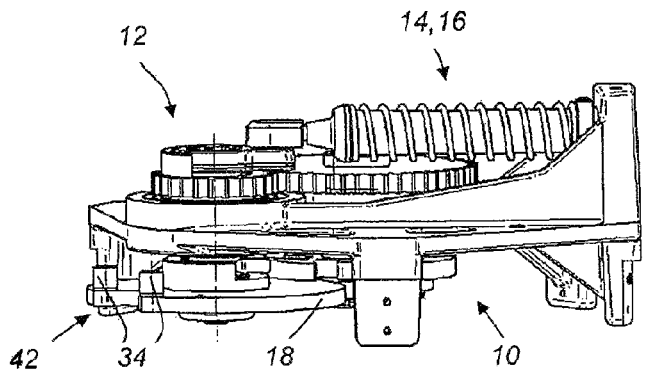
FIG. 7 is a further perspective view of the indexing transmission according to FIG. 5.

FIGS. 5 to 7 show several views of an alternative variant of embodiment of the indexing transmission 10 according to the invention. In this variant of the indexing transmission 10, the cam disk 18 has two blocking pins 34 on its end face near its outer edge and that cooperate with a star wheel 36 with a plurality of circumferential concave cam sections or cam segments 38. The star wheel 36 itself is rotationally fixed on the switch shaft 40 and in the illustrated embodiment at the same time forms the disk 22 with the engagement elements 24 or rollers 26. In this variant of the indexing transmission 10, only one set of disk 22 or star wheel 36 and cam disk 18 in operative engagement with one another is required, since the above-explained disk with rollers 26—which are on both faces and that cooperate with a pair of cam disks—is redundant by virtue of the pins 34 on the cam disk 18. The pins 34 can engage in the concave cam sections 38 on both faces near each roller 26. The pitch of this star wheel 36, which has concave segments 38 formed to be relative deep for receiving the pins 34, is advantageously matched to the number of engagement elements 24 or rollers 26 present. Thus, for example, in the case of the three rollers 26 also three pairs of concave cam sections 38 are required on the star wheel 36 so that this can perform the desired function.

The cam disk 18 has between the two adjacent blocking pins 34 a concave cam section 42 that cooperates with the engagement elements 24 or rotatable rollers 26 of the disk 22 or star wheel 36 such that, in the case of appropriate positioning of the cam disk 18 and the star wheel 36, the two blocking pins 34 simultaneously cooperate with and engage the concave cam sections 38 of the star wheel 36. The desired switching steps are effected in that the cam disk 18 in the non-blocked, rotating state of FIG. 5 rolls by its outer edge substantially free of play simultaneously against two rotatable pins 26 of the disk 22 or the star wheel 36. The concave cam sections and the corresponding rotatable rollers 26 of the star wheel 36 rotationally fixed with the switch shaft 40 each have a 120° pitch. This variant accordingly has three rollers 26 uniformly spaced around the edge of the star wheel 36 and corresponding cam segments 38 for receiving the blocking pins 34. However, other pitch steps are selectably also possible, in which two, four or, for example five or more rollers are uniformly spaced around the edge of the disk.

The invention claimed is:

1. An indexing transmission for an on-load tap changer or a tap selector of a tapped transformer, the transmission comprising:
   at least one rotatable cam disk having an outer edge formed with a succession of convex and concave cam formations in regular succession and merging with one another;
   a crank transmission driving the at least one rotatable cam disk;
   a drive output disk acted on by the at least one rotatable cam disk and having an outer edge;
   engagement rollers rotatable on an end face of the drive output disk near the outer edge of the drive output disk and rolling on the outer edge of the at least one rotatable cam disk; and
   a switch shaft rotationally fixed to the drive output disk such that the at least one rotatable cam disk in cooperation with the engagement rollers of the drive output disk triggers a stepped rotation of the switch shaft through a defined step angle.

2. The indexing transmission according to claim 1, wherein the engagement rollers are uniformly angularly spaced around the outer edge of the drive output disk and cooperate with the cam formations of the at least one rotatable cam disk.

3. The indexing transmission according to claim 1, wherein the drive output disk is, after each indexing of the at least one rotatable cam disk through a defined rotational angle and fixing angularly.

4. The indexing transmission according to claim 1, wherein the at least one rotatable cam disk comprises two rotatable cam disks coaxial or axially parallel to one another, of substantially the same size and outer profile, and rotationally fixed relative to one another on a common shaft coupled with the crank transmission, and in operative engagement with the engagement rollers that are coupled coaxially or axially parallel with the switch shaft, offset relative to one another, and rotatably mounted on the drive output disk.

5. The indexing transmission according to claim 1, wherein the outer edge of the at least one rotatable cam disk rolls free of play or with small radial play against the rotatably mounted engagement rollers of the drive output disk.

6. The indexing transmission according to claim 1, wherein the at least one rotatable cam disk in a non-blocked, rotating state rolls with its outer edge free of play simultaneously against two of the engagement rollers of the drive output disk that is blocked against rotation.

\* \* \* \* \*